US012520851B2

(12) United States Patent
Knodel et al.

(10) Patent No.: US 12,520,851 B2
(45) Date of Patent: Jan. 13, 2026

(54) PORTIONING DEVICE WITH CRIMPING MEMBER, AND ASSOCIATED PORTIONING METHOD

(71) Applicant: VEMAG Maschinenbau GmbH, Verden/Aller (DE)

(72) Inventors: Peter Knodel, Oyten (DE); Sven Kohler, Verden (DE)

(73) Assignee: VEMAG MASCHINENBAU GMBH, Verden (DE)

( * ) Notice: Subject to any disclaimer, the term of this patent is extended or adjusted under 35 U.S.C. 154(b) by 91 days.

(21) Appl. No.: 17/740,806

(22) Filed: May 10, 2022

(65) Prior Publication Data

US 2022/0361512 A1 Nov. 17, 2022

(30) Foreign Application Priority Data

May 12, 2021 (DE) .......................... 102021112513.8

(51) Int. Cl.
*A22C 11/10* (2006.01)
*A22C 11/00* (2006.01)
(Continued)

(52) U.S. Cl.
CPC ........ *A22C 11/008* (2013.01); *A22C 11/0254* (2013.01); *A22C 11/104* (2013.01); *A22C 11/125* (2013.01)

(58) Field of Classification Search
CPC ... A22C 11/008; A22C 11/02; A22C 11/0254; A22C 11/10; A22C 11/104; A22C 11/105
(Continued)

(56) References Cited

U.S. PATENT DOCUMENTS 3,296,657 A   1/1967 Moekle
4,073,039 A * 2/1978 Muller ................... A22C 11/02
                                                             452/49
(Continued)

FOREIGN PATENT DOCUMENTS

EP     0868852 A2    10/1998
EP     1112691 A1     7/2001
(Continued)

OTHER PUBLICATIONS

European Patent Office, Search Report issued in EP application No. 22172956.9, dated Oct. 12, 2022 '9 pages).

*Primary Examiner* — David J Parsley
(74) *Attorney, Agent, or Firm* — Wood Herron & Evans LLP

(57) ABSTRACT

A portioning device is provided for forming portions from elongate casings stuffed with food mass, in particular for forming sausages from alginate casings stuffed with sausage meat. The portioning device includes two circulating conveyor members spaced apart from one another and drivable by at least one drive element, and at least one crimping member arranged on each conveyor member and projecting laterally from the conveyor member. It is proposed that at least one of the crimping members has such a shape, on its functional area that in the conveying area at least partially faces an opposite crimping member, that corrugations, creases and/or folds extending substantially parallel to the conveying direction, in particular, are formed in the constricted portion of the casing, thereby producing a desirable shape for the portions separated.

18 Claims, 16 Drawing Sheets

(51) Int. Cl.
*A22C 11/02* (2006.01)
*A22C 11/12* (2006.01)

(58) Field of Classification Search
USPC .................................. 452/23, 37, 46, 48, 51
See application file for complete search history.

(56) References Cited

U.S. PATENT DOCUMENTS

| | | | | |
|---|---|---|---|---|
| 6,080,054 | A * | 6/2000 | Muller | A22C 11/006 |
| | | | | 452/49 |
| 7,044,845 | B2 * | 5/2006 | Coutandin | A22C 13/00 |
| | | | | 452/30 |
| 8,371,909 | B2 * | 2/2013 | Lowder | B65B 7/00 |
| | | | | 452/34 |
| 2023/0413743 | A1 * | 12/2023 | Beltrame | A01G 24/27 |

FOREIGN PATENT DOCUMENTS

| | | | |
|---|---|---|---|
| EP | 1430779 | A1 | 6/2004 |
| EP | 1875806 | B1 | 11/2011 |
| WO | 2006068207 | A1 | 6/2006 |
| WO | 2013139854 | A1 | 9/2013 |

* cited by examiner

PORTIONING DEVICE WITH CRIMPING MEMBER, AND ASSOCIATED PORTIONING METHOD

CROSS-REFERENCE TO RELATED APPLICATION

This application claims priority to German Application No. 10 2021 112 513.8, filed May 12, 2021. The above-mentioned patent application is incorporated herein by reference in its entirety.

TECHNICAL FIELD

This application relates to a portioning device and to a portioning method for separating portions from elongate casings, such as for separating sausages from alginate casings stuffed with sausage meat. This application also relates to a crimping member for a portioning device.

BACKGROUND

In prior art methods and devices for producing sausages, synthetic or natural gut casings are stuffed with a pasty mass such as meat emulsion with the help of a pump and portioned with the help of a portioning device; other types of mass are also stuffed into a casing in the same manner. In most cases, the mass is provided by a stuffing machine that has a feeding hopper and a feed pump.

In one kind of prior art method, a twist point separating the individual sausage portions from one another is produced in the gut casing by a twist linking unit and a portioning device. Such portioning devices are often referred to as length portioning equipment, in which portions or sausages having the same volume or the same length are produced. An example of such length portioning equipment consists substantially of two parallel circulating chains or belts that run parallel to each other at the same speed in a conveying direction in sections in a conveying area, and that constrict the stuffed gut casing in an intermediate space formed between the two chains or belts, preferably by a pre-crimping member.

In another type of portioning device, sausages are not twisted off, but the casing is coextruded in fluid form around a strand of the food mass. The casing, which in many cases is made of alginate, solidifies. After producing such a stuffed casing, and during further conveying in a conveying direction, crimping members or pre-crimping members impinge on the casing stuffed with food mass and displace both the food mass and the casing, thus creating a constriction point. For that purpose, laterally projecting crimping members or pre-crimping members are arranged on the conveyor members at intervals approximately equal to the length of a sausage and converge to form pairs with a crimping member that in operation is opposite on the adjacent conveyor member, thereby constricting the mass in the stuffed casing, together with the casing, in the region of a constriction point. On their functional area facing the opposite crimping member, the crimping members are shaped and spaced from each other in such a way, to act on the stuffed casing, that a substantially flat, approximately planar shape of the casing is produced in the region of the constriction point.

It has occasionally been observed in practice that the portions separated from each other cannot be completely closed in the region of the constriction points. This can lead to food mass escaping from the casing in an undesirable manner, or to sausages being produced which are not permanently or completely closed. The appearance of the sausage end produced does not meet aesthetic requirements, either, in many cases, for example it does not have the appearance of a twisted sausage that is often striven for. In the prior art, the typical constriction points are often absent from the sausages produced.

As a result, it would be desirable to provide an assembly and a portioning device and a (pre-)crimping member and a portioning method and a separator which counteract the aforementioned and other problems and which allow reliable formation of constriction points in a way that is gentle on the casing, and subsequent separation into portions, in particular into sausages.

SUMMARY

These and other technical objects and problems are addressed by the embodiments provided in this invention. To this end, the portioning device according to the embodiments of this invention is characterized in that at least one of the crimping members has such a shape, on its functional area that in the conveying area at least partially faces an opposite crimping member, that corrugations, creases and/or folds extending substantially parallel to the conveying direction, in particular, are formed in the constricted portion of the casing.

Due to the inventive shape on the functional area or the region of the outer surface of the crimping member(s), a constriction region is formed between two sausages or at their respective ends, particularly during pre-crimping, so that corrugations, creases and/or folds are formed in the casing which has been deformed in this way. These corrugations, creases and/or folds extend or are preferably oriented substantially parallel to the conveying direction. The crimping member preferably has indentations and/or projections at least partially on its functional area. Due to these—preferred—shapes of the crimping members according to the invention, an advantageous constriction point is created at the ends of adjacent sausages by the engagement of opposite crimping members with the stuffed casing and during conveyance along the conveying areas in the conveying direction, which constriction point results in reliably closed ends of the sausages and in an advantageous aesthetic appearance, in particular to one that comes close to or is largely identical to twisted sausages. Unlike in the prior art, the constriction point is slimmer than the outer contour of the sausages, i.e., it is inwardly tapered or compressed in comparison with the maximum width of the sausage. At the same time, a substantially flat, constricted constriction point can be created, at least partly with a planar shape as well, when the crimping members are shaped accordingly. This constriction point can then be severed completely in a separate separator, in particular in a further downstream crimping device, with the result that well-closed and aesthetically pleasing sausage ends are produced with typical folds or creases which remind one of pleated curtains.

Due to the shape of the crimping members, which preferably have indentations and/or projections, sausage ends that are completely or almost completely closed are produced. A fold direction is stipulated for a coextruded alginate casing (or casing made of similar materials) by the combination of such a preferably corrugated design of the (pre-)crimping members and their shape. This results in a function similar to that of a folded paper fan. When the sausage is separated by the final crimping members, the alginate casing folds up in a controlled manner. This produces a separation point with the same shape as that of sausages which have been twisted off and separated. Due to the inventive corrugated shape in the pre-crimping member, the outer contour also tapers in the region of the constriction point. This has the advantage that the final crimper—or some other separating device—has a defined region for constriction and separation. A reliably closed sausage end and a correspondingly shaped sausage is formed that has an aesthetically pleasing appearance overall.

The indentations and/or projections are preferably arranged substantially in a central region of the functional area, i.e., the shaping indentations and/or projections are narrower than the outer contour of a sausage strand. When the indentations and/or projections impinge on the sausage strand, an advantageous constriction is produced, also by the projections and/or indentations mechanically clamping the outer region of the casing and the sausage strand.

The indentations and/or projections are preferably arranged at least partially within a substantially planar portion of the surface of the functional area. Such a substantially flat portion allows a flat constriction point to be produced between two sausage ends, which can subsequently be severed reliably and cleanly.

According to a development of the invention, the indentations and/or projections extend substantially parallel to the conveying direction in the assembled state. This allows the sausage ends to be given a particularly attractive shape.

According to another preferred embodiment of the invention, the length of the indentations and/or projections on a crimping member differ, preferably in that the length of the indentations and/or projections increases outwards from a central region. This allows folding to be carried out advantageously and effectively.

According to an alternatively and preferred development of the invention, respective crimping members arranged opposite one another are, in operation, conformingly adapted on their functional area facing their opposite crimping member, in particular are adapted and arranged relative to one another on the conveyor members in such a way that an indentation on the one crimping member is arranged opposite a projection on the other, opposite crimping member, and/or a projection on the one crimping member extends at least partly into an indentation on the other, opposite crimping member, and the casing therebetween is corrugated, folded, and/or creased accordingly to form corrugations, creases and/or folds.

The crimping member is advantageously developed by a first leg surface at the front in the conveying direction and/or a second leg surface at the rear in the conveying direction being formed on a crimping member adjacent the central region of a crimping member, the first leg surface being at least partly arranged substantially at an angle to the central region and the second leg surface being at least partly arranged substantially at an angle to the central region. The facing ends of the sausages, between which the crimping member defines their shape, can be given a particularly advantageous shape by the adjacent leg surfaces, relative to the central region, of the crimping member. Hemispherical or elliptical or similarly shaped sausage ends are particularly desirable and can be produced by the first leg surface and/or the second leg surface having a concave shape at least partly. It is particularly preferred that the first and/or second leg surface has a concave shape that is substantially spherical, elliptical or parabolic or similarly curved, such that a substantially hemispherical, elliptical or parabolic end of a sausage portion is formed by the co-operation of oppositely arranged crimping members.

The interaction of co-operating opposite crimping members to shape the constriction point and the sausage ends is advantageously developed by at least one crimping member having guide members, preferably plate-shaped guide members, spaced apart from one another in outer regions in relation to the central regions, which preferably have indentations and/or projections, said guide members being spaced apart at such a distance from each other that the crimping member oppositely arranged in the conveying area, in operation, can be gripped at least partially on both sides by the guide members. The guide members mechanically guide or align the opposite crimping members relative to each other and stabilize them, and die stuffed casing is gripped and protected from bursting while it is being shaped.

According to a preferred embodiment, the width of the indentations and/or projections, measured substantially transversely to the conveying direction, is approximately 0.2-0.8 of the total width of the crimping member.

Experiments have also shown that it is advantageous if the indentations and/or projections correspond substantially, in a side view, to one of the following shapes: a waveform, a triangular waveform, a square waveform, an undulating waveform, a sinusoidal waveform.

Assembly or dismantling for maintenance purposes can be carried out particularly well and advantageously if, on its side facing the conveyor member, i.e., on the attachment region for attachment to the conveyor member, a crimping member has attachment elements for coupling the crimping member releasably and form-lockingly to the conveyor member, preferably fasteners and/or latching elements and/or projections and/or indentations.

According to another embodiment of the invention, a crimping member of the kind initially specified achieves the object of the invention by at least one of the crimping members having such a shape, on its functional area that in the conveying area at least partially faces an opposite crimping member, that corrugations, creases and/or folds extending substantially parallel to the conveying direction, in particular, are formed in the constricted portion of the casing.

With regard to the advantages of such a crimping member, reference is made to the above descriptions of the portioning device according to the invention in order to avoid repetitions.

It is expedient if the crimping member is developed with the preferred features of the crimping member as previously described.

According to another embodiment of the invention, the object of the invention is achieved, in a method of the kind initially specified, by corrugations, creases and/or folds being formed due to the shape and arrangement of the opposite crimping members in the constriction region of the casing, which extend substantially parallel to the conveying direction, and by a corresponding assembly. With regard to the advantages thus achieved, reference is likewise made to the above descriptions of the devices.

After portioning, the sausage portion is preferably separated with the aid of a separator for separating portions from elongate casings stuffed with food mass, in particular for separating sausages by crimping members. Such a separator, which is preferably coupled to the portioning device described in the foregoing and arranged downstream therefrom (in the conveying direction), shall now be described in more detail with reference to preferred embodiments of the separator.

The separator is advantageously developed in such a way that the disadvantages encountered in the prior art are eliminated as far as possible. In particular, a device is to be specified that allows the ends of the portions to be given a round and uniform shape. According to the invention, the object of the invention is achieved, in the case of a separator (or crimping device) by the legs being curved on their side facing an adjacently arranged second crimping member in operation, such that the stuffed casing is first constricted in a constriction region with displacement of the mass, and then severed. The separator makes use of the fact that, during the relative movement of the oppositely arranged crimping members toward each other and at least partially past each other, and due to the curvature of crimping members, the sausage mixture is initially displaced beyond the actual shape to be produced, namely the round shape of the sausage ends, so that a round shape can form at the sausage end after the mass has relaxed or flowed back. A round portion end can still be formed in an advantageous manner by the curved shape of the crimping members even when the sausage is subjected to cooking after separation and is subject to shrinkage. It is thus possible to produce visually appealing and uniformly formed sausage portions.

The separator is developed by the curvature being in the form of a convex curvature. The convex curvature preferably extends transversely to the conveying direction across the entire width of the crimping member. The convex curvature has proven to be particularly preferable for forming the round or almost round ends of the sausage portions.

According to a preferred embodiment, the base portion also has a curvature which is in the form of a convex curvature, in particular. Both the legs and the base portion preferably have a common convex curvature, with the curvatures merging into each other without creases, i.e., in a mathematically continuous manner. In other words, the legs are shaped like a pair of trousers, with the legs being trouser legs, in a sense. The trousers thus have a basic convex shape.

According to a preferred embodiment, a cutting edge is formed on the inner side of the legs. The cutting edge is preferably designed in such a way the sausage portion can be reliably severed, but without damaging the casing during displacement of the sausage mixture.

According to a preferred embodiment, the crimping member is made of or consists of one of the following materials: metal, polyoxymethylene (POM). The respective materials have proven to be particularly suitable for forming the crimping members. The materials can be selected, for example, according to the diameter or caliber of the sausages to be processed, or also according to the casing material being used or the thickness of the casing material.

The invention is developed by the crimping members being oriented relative to the conveyor members in such a way that the crimping members are guided in the conveying area adjacent and parallel to each other. This ensures that the crimping members can be guided parallel to and adjacent each other, despite the conveyor members being arranged so that they move toward each other in the conveying direction.

According to a preferred embodiment, the conveyor members have receiving elements for receiving the attachment portions of the crimping members. The receiving elements of the conveyor members are designed in such a way that the crimping members can be easily replaced and at the same time form a reliable and durable connection with the conveyor members in operation. In this way, the separator can be easily adapted to different sausage calibers and casing materials, and the crimping members can also be replaced easily in the event of wear.

According to a preferred embodiment, the curved region has a thickness, viewed in the conveying direction, of 5 mm to 20 mm, and a height, viewed in the conveying direction, of 60 mm, in particular.

The thickness range of the curved region has proven to be particularly suitable for facilitating the formation of round or almost round portion ends. The thickness in question is to be understood in such a way that the curvature, in particular the convex curvature, has the relevant thickness in the conveying direction or in the opposite direction to the conveying direction, depending on the orientation of the crimping members, and that the curvature extends, in particular, across the entire thickness range of the crimping member.

The invention is developed by the opening angle of 15° to 120° between the legs. This range of opening angles ensures that the sausage portions are reliably separated and facilitates displacement of the sausage mixture.

The invention has been described above with reference to a separator. In another embodiment, the invention relates to a crimping member for a separator for separating portions from elongate casings stuffed with food mass, in particular for separating sausages from alginate casings stuffed with sausage meat, said crimping member having an attachment portion for attaching it to a movable conveyor member and a crimping portion arranged adjacent the attachment portion, wherein the crimping portion has two legs that open from a base portion.

With regard to the crimping member, the invention achieves the object initially specified by the legs being curved on their side facing an adjacently arranged second crimping member in operation, such that the stuffed casing is first constricted in a constriction region with displacement of the mass, and then severed.

The crimping member is designed in accordance with at least one of the characterizing features of the above embodiments. The crimping member thus utilizes the same advantages and preferred embodiments as the separator according to the invention, and vice versa. Reference is made in this regard to the observations above, the content of which is incorporated here by reference.

Another embodiment of the invention relating to the separator relates to a method for forming and separating portions from elongate casings stuffed with food mass, in particular for forming and separating sausages from alginate casings stuffed with sausage meat, in which method food mass is stuffed by a stuffing machine into the casing to be stuffed, the stuffed casing is conveyed in a conveying direction by a separator, wherein the stuffed casing is brought between two drivable, circulating conveyor members and is constricted and separated in a constriction region by two adjacently arranged crimping members each arranged on a conveyor member. The separator is used in such a way that the crimping members are curved such that the mass is displaced beyond the sausage shape to be produced, so that a round shape is formed at the ends of the sausage portions after the mass has relaxed or flowed back. The invention is developed by the separator being designed in accordance with one of the above embodiments. The method utilizes the same advantages and preferred embodiments as the separator according to the invention and the crimping member according to the invention, and vice versa. Reference is made in this regard to the observations above, the content of which is incorporated here by reference.

BRIEF DESCRIPTION OF THE DRAWINGS

Further advantages, features and possible applications of the present invention will be apparent from the following detailed description in connection with the drawings. The accompanying drawings, which are incorporated in and constitute a part of this specification, illustrate one of more embodiments of the invention and, together with the general description given above and the detailed description given below, explain the one or more embodiments of the invention.

DETAILED DESCRIPTION

Figure 1:
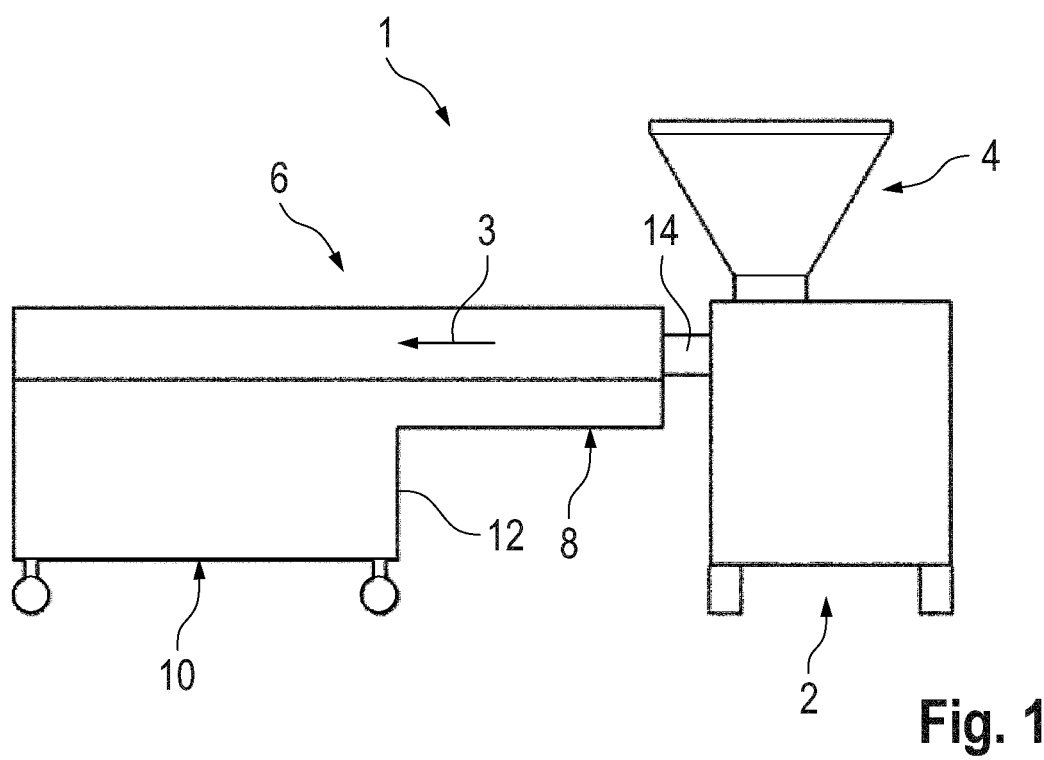
FIG. 1 shows a side view of an assembly for producing portions from a casing stuffed with a food mass, including a stuffing machine and a portioning device (pre-crimping device), and also a separator (crimping device).

FIG. 1 shows an assembly 1 for producing portions from a casing stuffed with a mass, in particular a pasty food mass.

Figure 2:
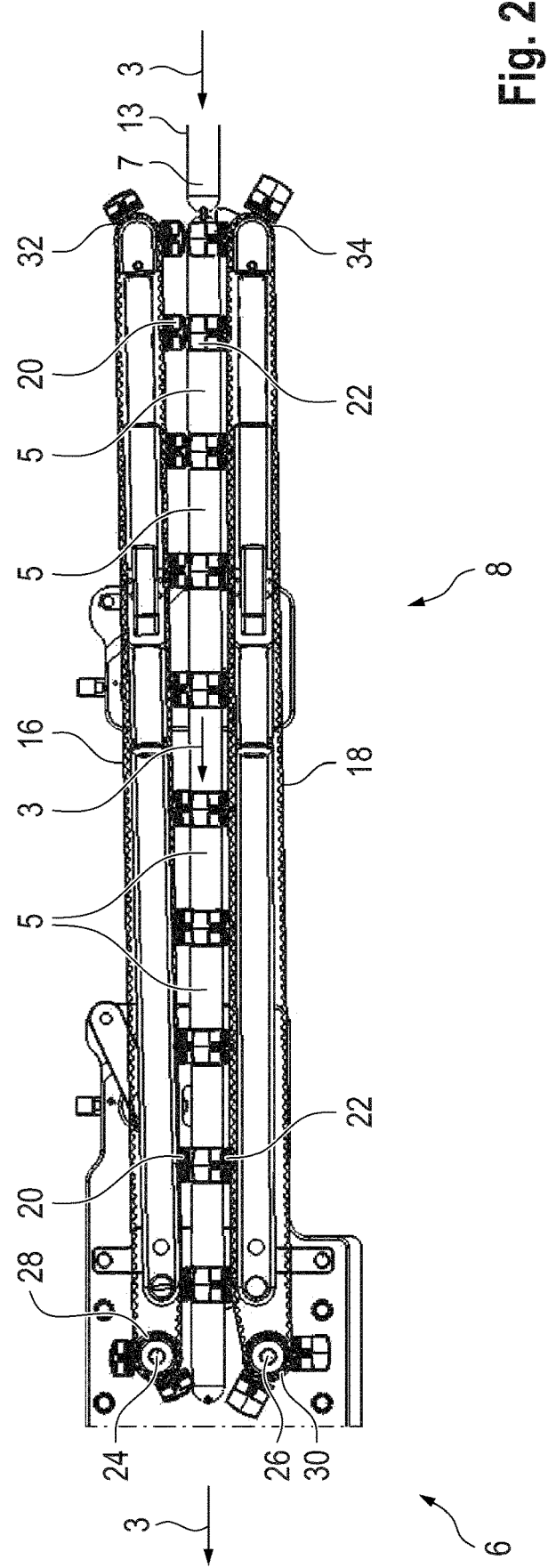
FIG. 2 shows a side view of a part of the portioning device.

The food mass is preferably sausage meat for producing sausages 5, as shown in FIG. 2. The casing is preferably made of an initially fluid, solidifying alginate, which is coextruded with the food mass which has been shaped into a strand. Assembly 1 comprises a stuffing machine 2 having a feeding hopper 4 for receiving the food mass and having a feed pump, not shown, a stuffing tube for stuffing the food mass into the casing to be stuffed, or a coextrusion unit for coextruding the mass and the alginate, or the like. Assembly 1 further comprises a portioning device 6 and a controller, which is preferably provided in stuffing machine 2.

According to this embodiment, portioning device 6 preferably comprises a pre-crimping device 8 and a downstream crimping device 10, both crimping devices 8, 10 being arranged on a machine frame 12. A coextrusion unit 14 is arranged between stuffing machine 2 and portioning device 6. In a manner which is known per se, this is used to extrude a sausage strand 7 made of sausage meat and an outer sausage casing 13 made of alginate, which is initially fluid and solidifies to form a slightly elastic casing 13 around sausage strand 7.

Figure 3:
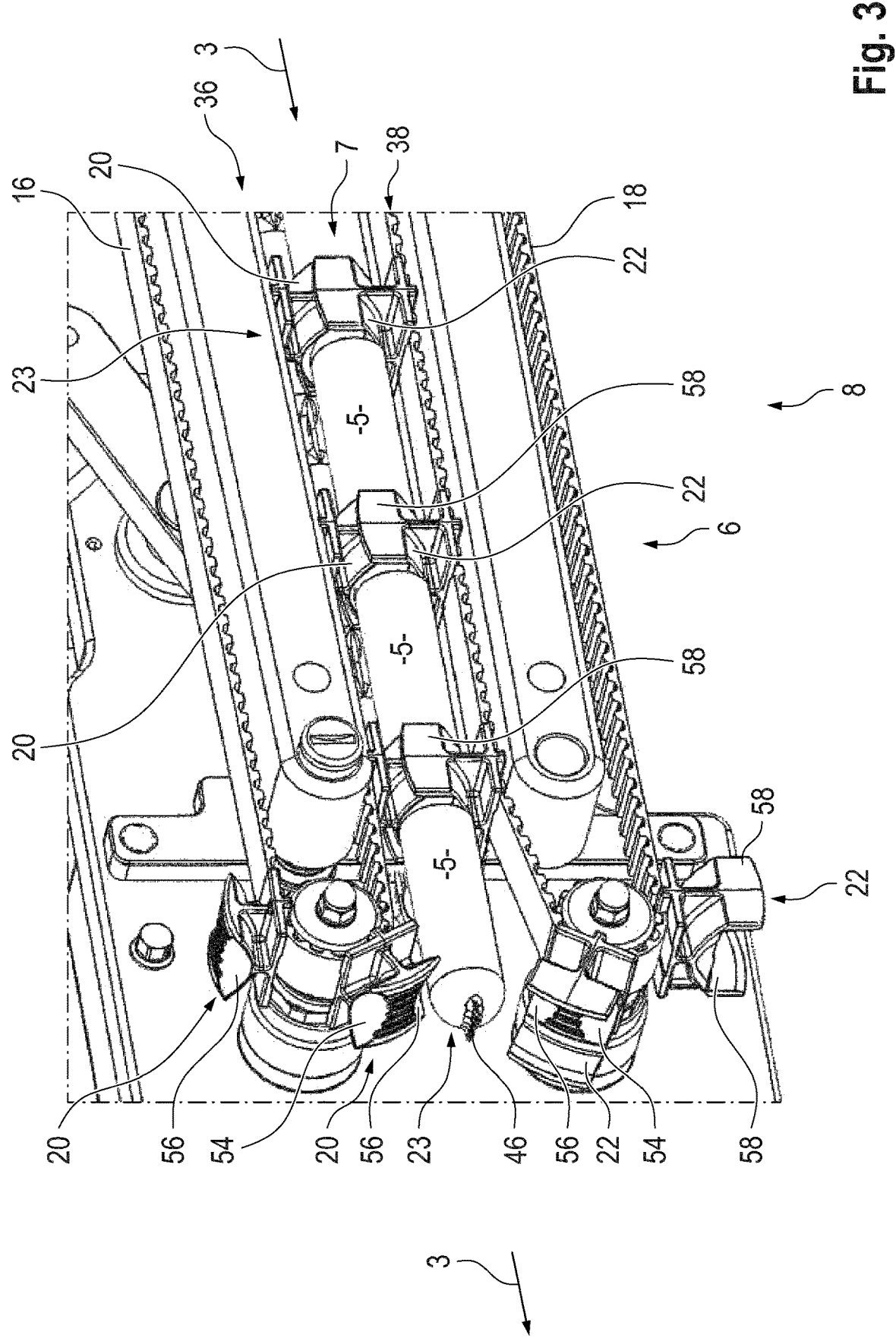
FIG. 3 shows a side view of the portioning device with two spaced-apart conveyor members and crimping members.
Figure 4:
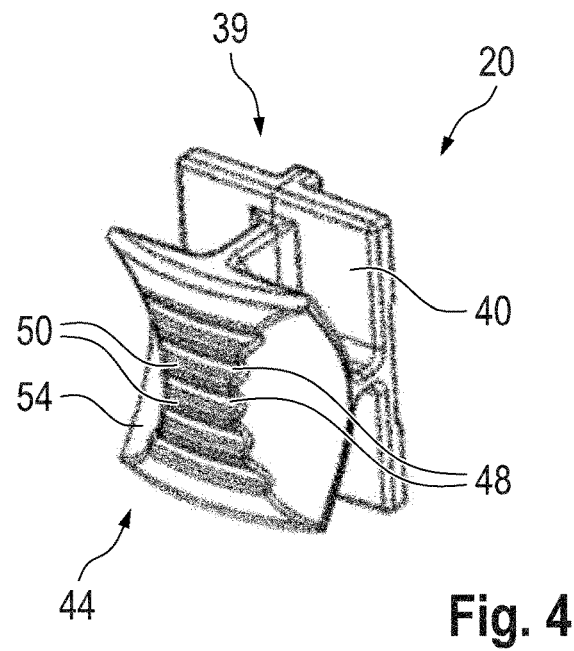
FIG. 4 shows a perspective view of a crimping member.
Figure 5:
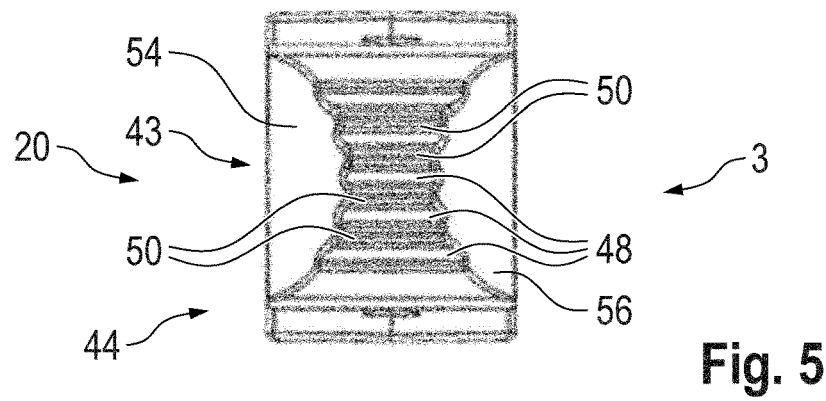
FIG. 5 shows the crimping member of FIG. 4 in a front view onto the functional area.
Figure 6:
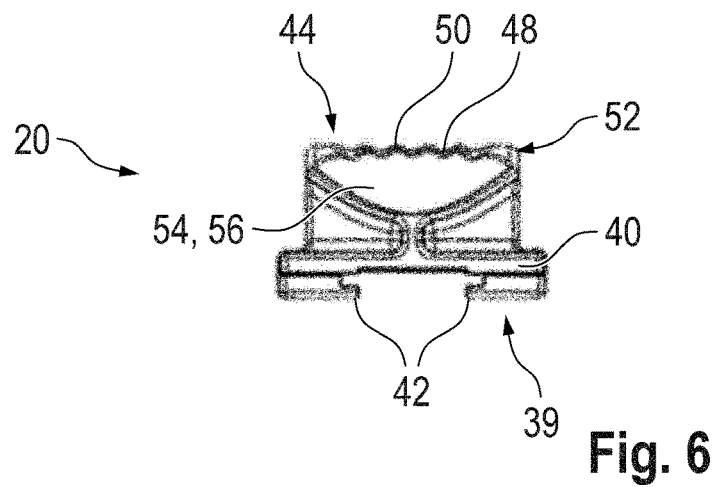
FIG. 6 shows a side view of the crimping member of FIG. 4.
Figure 7:
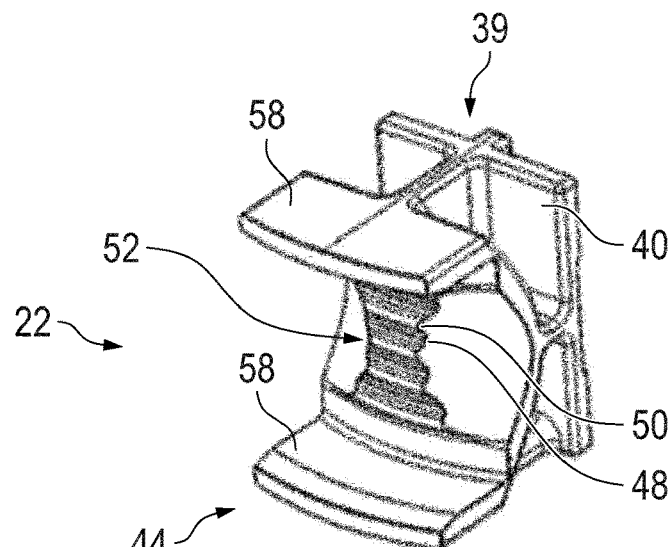
FIG. 7 shows a perspective view of an alternative embodiment of a crimping member.
Figure 8:
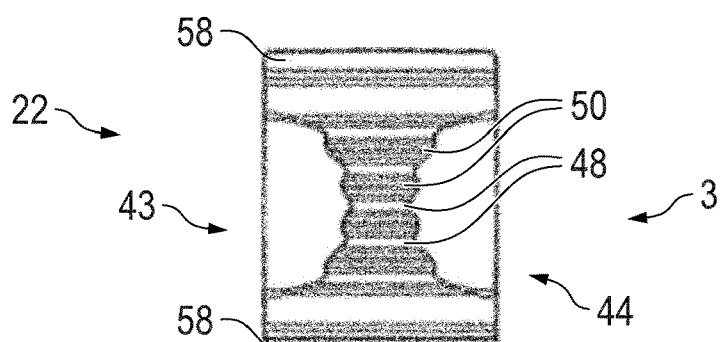
FIG. 8 shows the crimping member from FIG. 7 in a front view onto the functional area.
Figure 9:
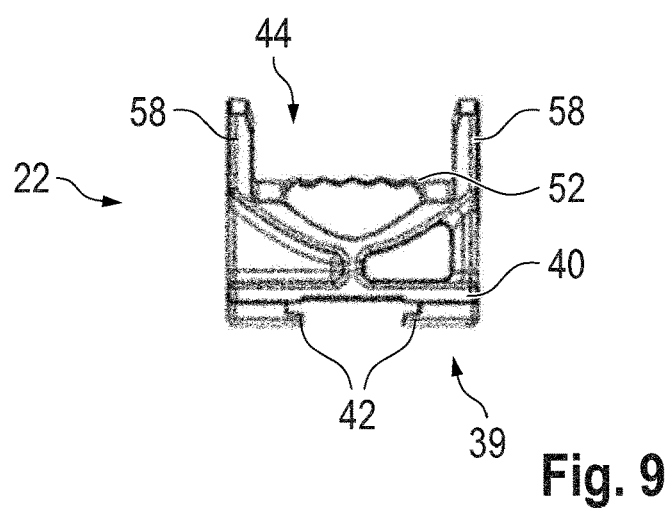
FIG. 9 shows a side view of the crimping member from FIG. 7.

As shown in FIGS. 1, 2 and 3, a co-extruded sausage strand 7 consisting of casing 13 and sausage meat is conveyed in operation in conveying direction 3 and received and further processed by portioning device 6, and single length-portioned sausages 5 or similar food products are produced. The pre-crimping device 8 shown in a side view in FIGS. 2 and 3 is part of portioning device 6 and is arranged downstream from coextrusion unit 14 in conveying direction 3 (FIG. 1), in order to receive sausage strand 7, convey it further in conveying direction 3 and to divide it by crimping into single portions or sausages 5.

The portioning device 6 shown in FIGS. 1, 2, 3, and 13, having pre-crimping device 8, comprises two conveyor members 16, 18 which are made of a flexible material or alternatively embodied as a chain. Conveyor members 16, 18 are designed as a circulating toothed belt, as can well be seen in FIG. 2 and FIG. 3. A plurality of crimping members 20, 22 are preferably coupled by a form-fitting snap connection or fastener connection or riveted connection to conveyor members 16, 18. Crimping members 20, 22 project laterally from the respective conveyor member 16, 18 and have a shape and distance apart such that, in operation, opposite co-operating crimping members 20, 22 act on the substantially cylindrical contour of sausage strand 7 that constriction regions 23 are formed in sausage strand 7, and sausages 5 are formed during conveyance in conveying direction 3. Portioning device 6 has a drive element (e.g., a motor), not shown in further detail, in the form of an electric motor, a first drive shaft 24 and a second drive shaft 26, and gear wheels, not shown, which couple the two drive shafts 24, 26 such that the two drive shafts 24, 26 are driven synchronously and in opposite directions by the drive element. At their top end, drive shafts 24, 26 each have a gear wheel 28, 30 that drive conveyor members 16, 18. By another two gear wheels 32, 34, conveyor members 16, 18 are additionally supported and guided. In a manner known per se and not shown in detail, all the components of portioning device 6 are attached to a machine frame, which may have a plurality of sections such as mounting plates.

Each conveyor member 16, 18 has a conveying area 36 in which, during operation, the components are moved with sausage strand 7 substantially in conveying direction 3, a first deflection in the area of gear wheels 32, 34, and a second deflection region spaced apart in conveying direction 3, in the area of gear wheels 28, 30. Each conveyor member 16, 18 also has a return area in which the sections of conveyor members 16, 18 are moved in the opposite direction to conveying direction 3. Conveyor members 26, 28 are arranged at a distance from each other in such a way that the stuffed casing or sausage strand 7 and the sausages 5 being formed enter the space between conveyor members 26, 28 with crimping members 20, 22 and can be guided and conveyed in conveying direction 3.

As FIGS. 2 and 3 well illustrate, crimping members 20, 22 projecting laterally from conveyor members 16, 18 are arranged in such a way, at specific distances from each other that correspond approximately to the length of a sausage 5, that two synchronously driven crimping members 20, 22 that are substantially opposite one another in the deflection region and conveying area 36, 38 can always co-operate in such a way that they move in the deflection region toward sausage strand 7 and come into contact with sausage strand 7 and form or begin to form the constriction point or constriction region 23, which can also be seen well in FIGS. 13, 14, 15 and 16.

As FIGS. 4 to 9 illustrate, each crimping member 20, 22, on its attachment region 39, has a substantially plate-shaped, cuboidal attachment portion 40 which is used to attach each crimping member 22 to conveyor member 16, 18. For that purpose, attachment portion 40 has two projections 42 on its rear side (FIG. 6), which can co-operate with conveyor member 16, 18, for example to form a kind of snap-fit connection. However, the attachment portion 40 may be differently attached to the conveyor members 16, 18, for example, via fasteners or rivets or adhesive.

As FIGS. 3-9 illustrate, each of the crimping members 20, 22 has such a shape, on its functional area 44 that in conveying area 36, 38 at least partially faces an opposite crimping member 20, 22, that corrugations, creases and/or folds 46 are formed in the constriction region 23 of a sausage in the region of sausage casing 13, as also shown in FIGS. 10-12 and 14-16. These corrugations, creases and/or folds 46 extent substantially parallel to conveying direction 3, which runs parallel to the longitudinal axis of sausages 5.

As FIGS. 4-9 illustrate, each crimping member 20, 22 preferably has indentations 48 and/or projections 50 at least partially on its functional area 44. Indentations 48 and/or projections 50 are preferably arranged substantially in a central region 43 of the functional area 44. As can be seen from FIGS. 6 and 9, for example, indentations 48 and/or projections 50 are at least partially arranged within a substantially planar portion 52 of the surface, in which indentations 48 and/or projections 50 are formed. The lengths of indentations 48 and/or projections 50 on a crimping member 20, 22 differ at least partially, with the length of indentations 48 and/or projections 50 preferably increasing outwards from a central region. The length is understood here in the embodiment as the length in operation in conveying direction 3.

In operation, respective crimping members 20, 22 arranged opposite one another are conformingly adapted on their functional area 44 facing their opposite crimping member 20, 22 and are arranged on the conveyor members 16, 18 in such a way that an indentation 48 on the one crimping member 20 is arranged opposite a projection 50 on the other, opposite crimping member 22 and/or a projection 50 on the one crimping member 22 extends at least partly into an indentation 48 on the other, opposite crimping member 20, and the sausage casing 13 therebetween is flattened accordingly in constriction region 23 due to the substantially flat portion 52 and simultaneously corrugated, folded, and/or creased due to indentations 48 and/or projections 50 to form corrugations, creases and/or folds 46.

As can likewise be seen from FIGS. 3-9, a first leg surface 54 at the front in conveying direction 3 and/or a second leg surface 56 at the rear in conveying direction 3 are preferably formed on each crimping member 20, 22 adjacent its central region 43, the first leg surface 54 being at least partly arranged substantially at an angle to the central region and the second leg surface 56 being at least partly arranged substantially at an angle to the central region 43. The first leg surface 54 and/or the second leg surface 56 preferably has at least partly a concave shape. Other shapes are also possible. The first and/or second leg surface 54, 56 may have a concave shape that is substantially spherical, elliptical or parabolic or similarly curved, such that a substantially hemispherical, elliptical or parabolic end of a sausage portion 5 is formed by the co-operation of oppositely arranged crimping members 20, 22, as is also shown in particular by FIGS. 3, 14, 15 and 16; a substantially hemispherical shape is shown there.

Crimping members 22 preferably have plate-shaped guide members 58, as can well be seen from FIGS. 3 and 7-9, in particular. Guide members 58 are spaced apart from one another in outer regions in relation to the central regions 43, which preferably have indentations 48 and/or projections 50, and are preferably spaced apart at such a distance from each other that crimping member 20 oppositely arranged in conveying area 36, 38 in operation (see FIGS. 4-6) can be gripped at least partially on both side by guide members 58. The stuffed sausage casing 13 is thus gripped and protected from bursting while it is being shaped.

As shown in FIGS. 4-9, indentations 48 and/or projections 50 substantially form a waveform when viewed from the side.

Figure 10:
FIG. 10 shows a schematic view of yet another alternative embodiment of a crimping member.
Figure 11:
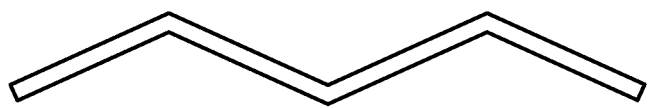
FIG. 11 shows a schematic view of another alternative embodiment of a crimping member.
Figure 12:
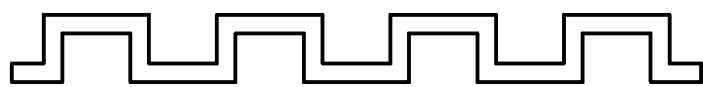
FIG. 12 shows a schematic view of an alternative embodiment of a crimping member.

As the alternative embodiment of crimping members 20, 22 in FIGS. 10, 11 and 12 show, indentations 48 and/or projections 50 may also have a triangular waveform with more acute angles (FIG. 10), a triangular waveform with less acute angles (FIG. 11), a square waveform (FIG. 12), or undulating waveforms, sinusoidal waveforms or the like, which are not shown.

Further features, and the operation of assembly 1 and portioning device 6 according to the invention, and also the method for producing portions, and other advantageous features, will become apparent from the following descriptions:

Food mass such as sausage meat is conveyed from the feeding hopper 4 of stuffing machine 2 by the feed pump and stuffed into the casing. Conveying can preferably be carried out continuously or also discontinuously, as an alternative.

Figure 13:
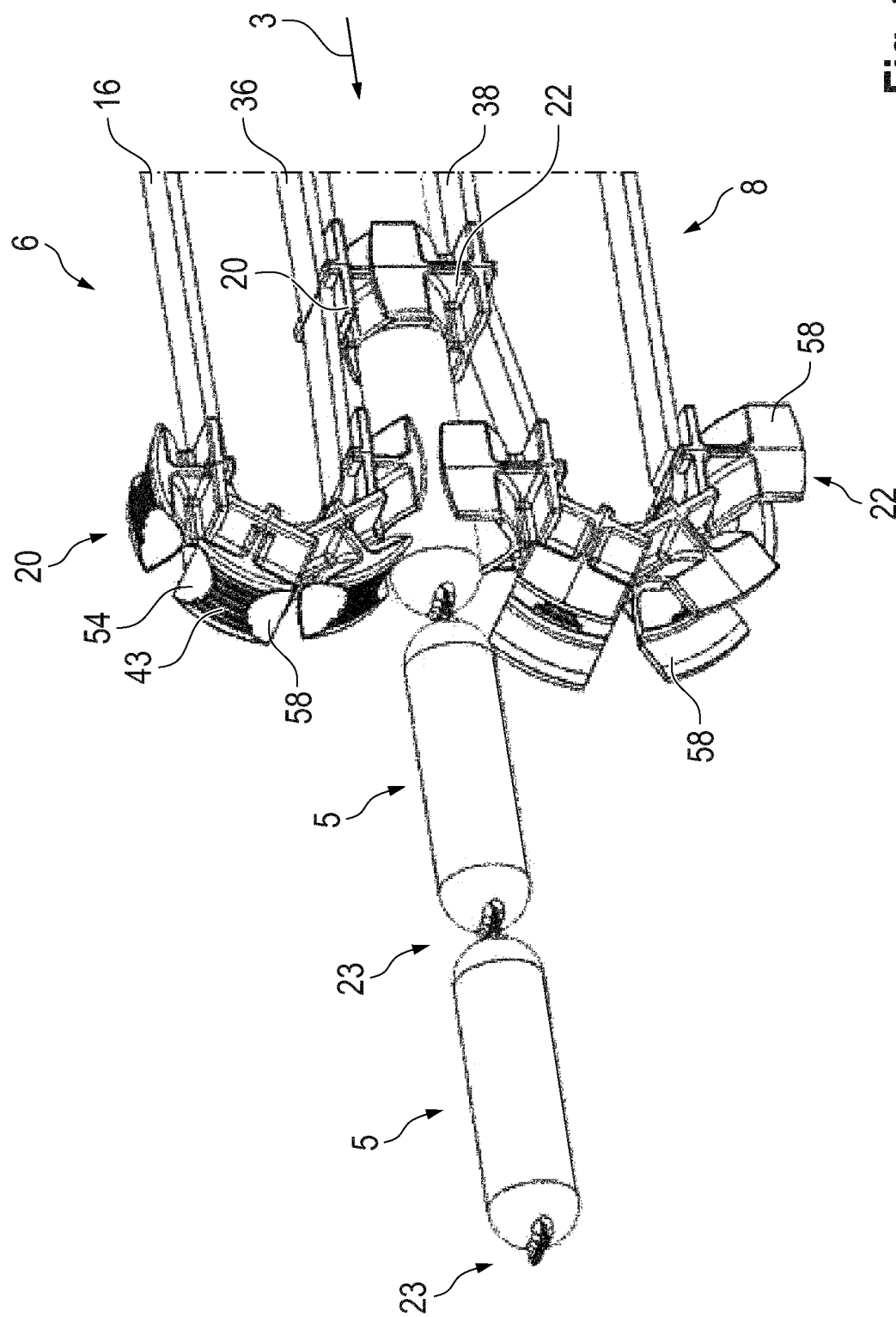
FIG. 13 shows another perspective view of the portioning device, with two spaced-apart conveyor members and crimping members in operation, and with views of portioned sausages.

By stuffing machine 2, a strand of food mass, preferably sausage meat together with an initially fluid and then solidified alginate casing, is extruded in coextrusion unit 14 (FIG. 1) to produce a sausage strand 7 (FIGS. 2, 3, 13). The stuffed sausage casing 13 is conveyed to the portioning device 6 having pre-crimping device 8, which simultaneously forms a conveying direction for further conveying in conveying direction 3. The stuffed casing 13 is brought into the region between two drivable, circulating conveyor members 16, 18 and is constricted in constriction region 23 by two oppositely arranged crimping members 20, 22 each arranged on a conveyor member 16, 18. As was also described exactly in the foregoing with reference to assembly 1 and crimping members 20, 22, corrugations, creases and/or folds which extend substantially parallel to conveying direction 3 are formed in operation due to the shape and arrangement of the opposite crimping members 20, 22 in the constriction region 23 of sausage casing 13.

Figure 14:
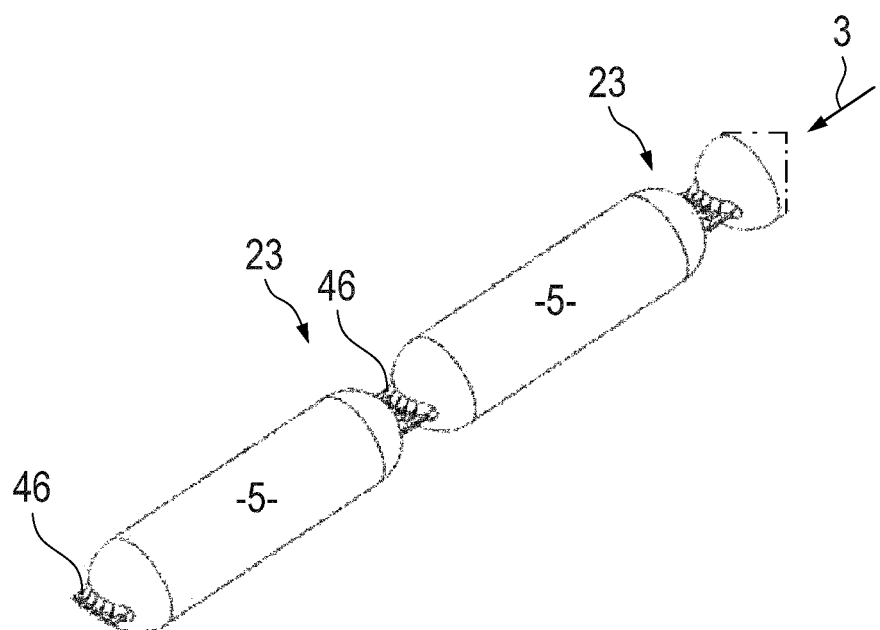
FIG. 14 shows a perspective view of portioned sausages.
Figure 15:
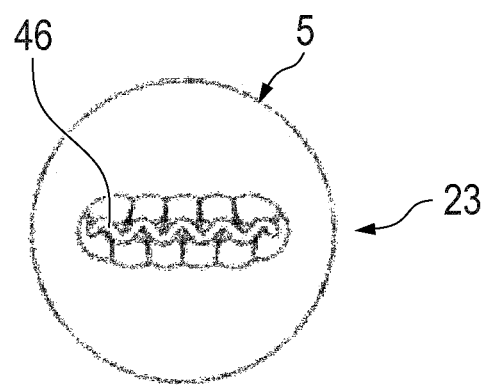
FIG. 15 shows a view of the end face of a portioned sausage.
Figure 16:
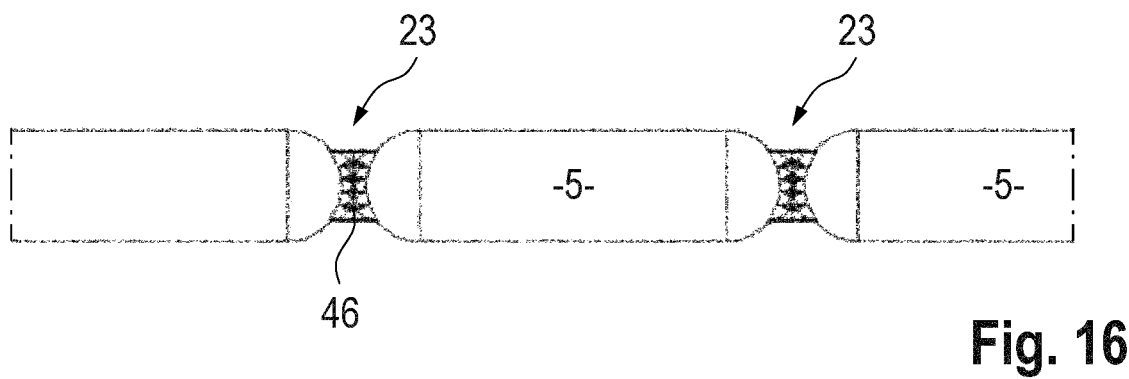
FIG. 16 shows a top view of portioned sausages.

The sausage strand 7 produced and portioned in this way and subdivided into single sausages 5 is conveyed further to crimping device 10, not shown in greater detail, in which the sausages 5, which initially are still linked (see, for example, FIG. 13 or 14 or 16, are completely separated in the middle of the respective constriction portions by crimping members or separator members, for example by co-operating blade-like separator members, so that completely separated sausages 5 are then formed which can be conveyed further in conveying direction 3 and then put into packaging, for example.

Figure 17:
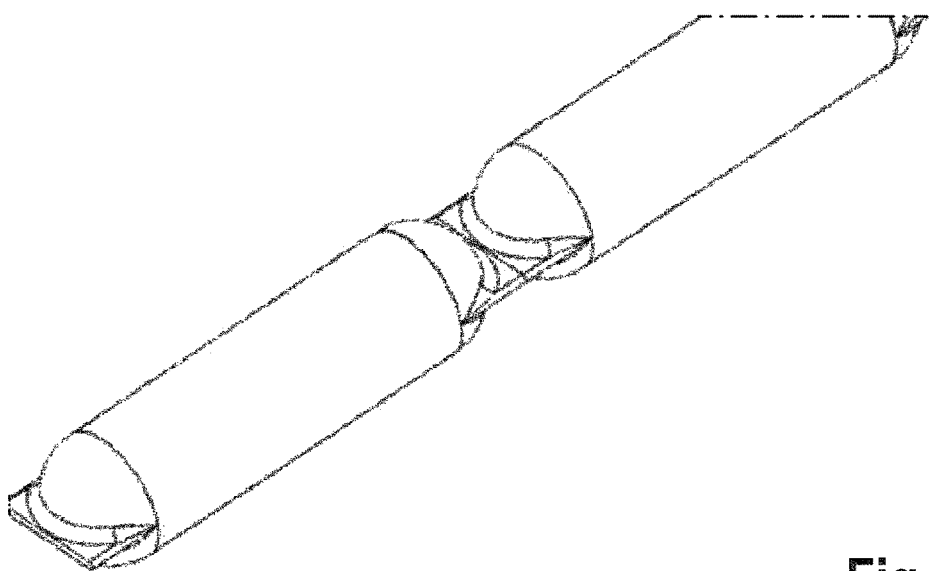
FIG. 17 shows a perspective view of portioned sausages made according to the prior art.
Figure 18:
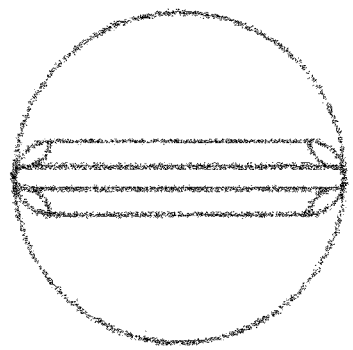
FIG. 18 shows a view of the end face of a portioned sausage made according to the prior art and consistent with FIG. 17.
Figure 19:
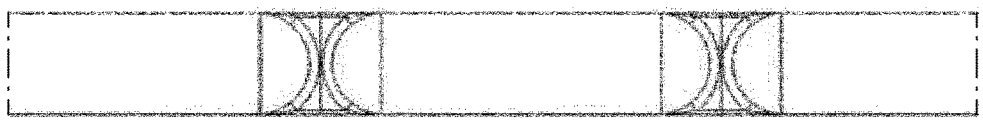
FIG. 19 shows a top view of a portioned sausage made according to the prior art and consistent with FIG. 17.
Figure 20:
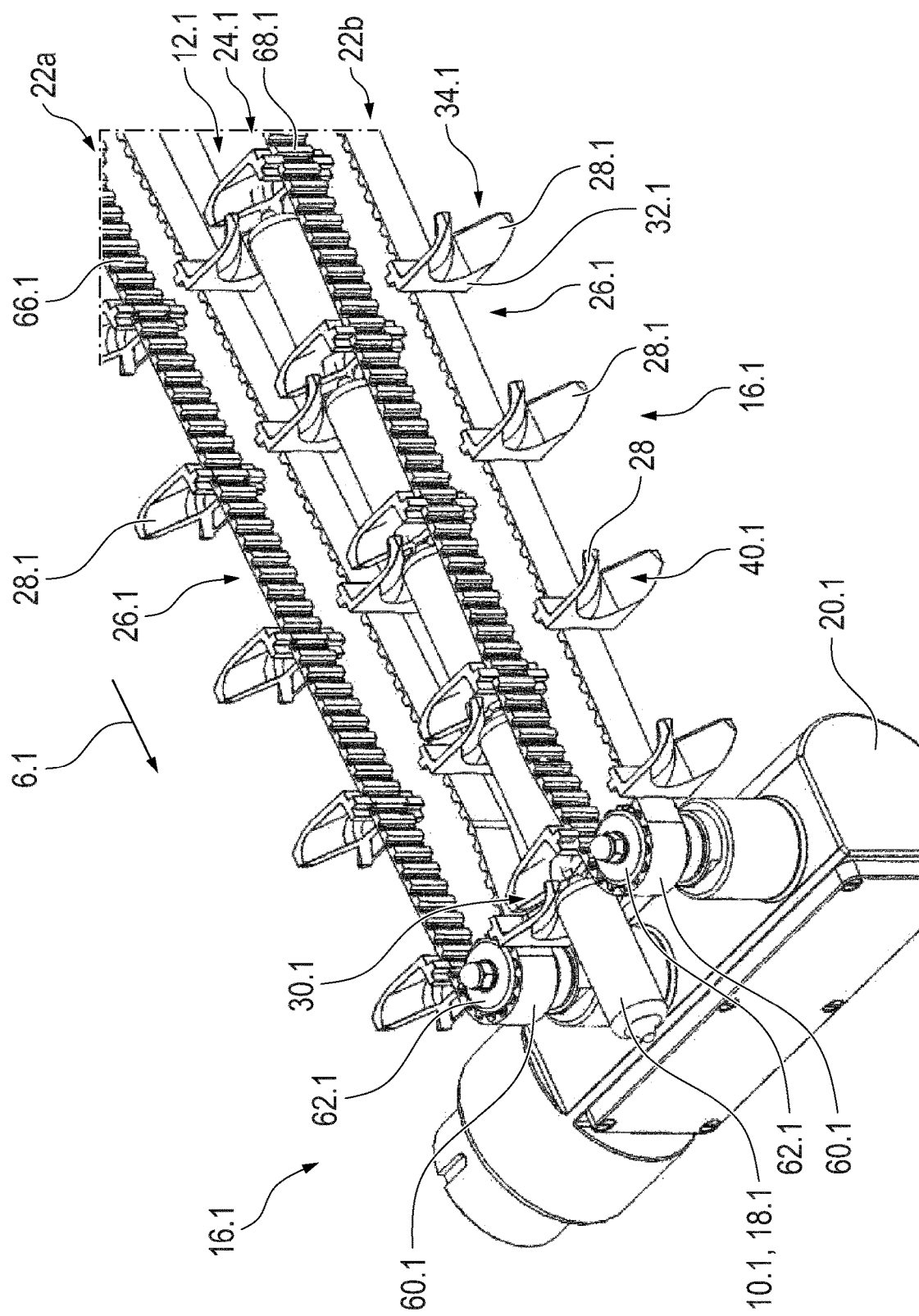
FIG. 20 shows a perspective view of a separator that may be used with the assembly of FIG. 1 and embodiments of this invention.

FIGS. 17-19 illustrate sausages 5 produced according to the prior art, with substantially smooth constriction regions without corrugations or the like.

The separator or crimping device 10 (FIG. 1), which is part of assembly 1, shall now be described with further reference to FIGS. 20-27; the described features can be combined singly or in any combination with assembly 1.

Separator 16.1 is designed to form sausage portions 10 from sausage strand 12.1. Separator 16.1 has two circulating conveyor members 22a, 22b arranged at a distance from each other. Conveyor members 22a, 22b can be driven by a drive element 20.1. Conveyor members 22a, 22b each have a conveying area 24.1, which in operation is moved in a conveying direction 6.1. The circulating conveyor members 22a, 22b also have a return area 26.1. Stuffed casings 18 are introduced between the conveying areas 24 of the two conveyor members 22a, 22b and conveyed in conveying direction 6.1. Conveyor members 22a, 22b are oriented in such a way that the distance between conveyor members 22a, 22b in the conveying area 24.1 decreases conveying direction 6.1.

Crimping members 28.1 are arranged on each of conveyor member 22a, 22b and project laterally from conveyor member 22a, 22b. Two crimping members 28.1 of each one of conveyor members 22a, 22b are arranged adjacent one another. Due to the orientation of conveyor members 22a, 22b relative to each other, crimping members 28.1 move toward each other when conveyor members 22a, 22b are moved in conveying direction 6.1. In other words, crimping members 28.1 are moved parallel to each other and toward each other and at least partially past each other when conveyor members 22a, 22b move in conveying direction 6.1.

Crimping members 28.1 each have an attachment portion 32.1 for attaching crimping members 28.1 to conveyor member 22a, 22b. A crimping portion 34.1 is arranged adjacent attachment portion 32.1. Crimping members 28.1 are provided with a curvature 40.1 on a side facing away from the respective adjacently arranged crimping member 28.1. Stuffed casing 18.1 is first constricted in a constriction region 30.1 with displacement of the stuffing mass, and then severed.

Crimping members 28.1 are oriented relative to conveyor members 22a, 22b in such a way that crimping members 28.1 are guided in conveying area 24.1 adjacent and parallel to each other. Conveyor members 22a, 22b each have a conveyor belt 66.1, 68.1. Conveyor belts 66.1, 68.1 are driven by a toothed belt drive 62.1. A deflection region 60.1 is located between conveying area 24.1 and return area 26.1.

Figure 21:
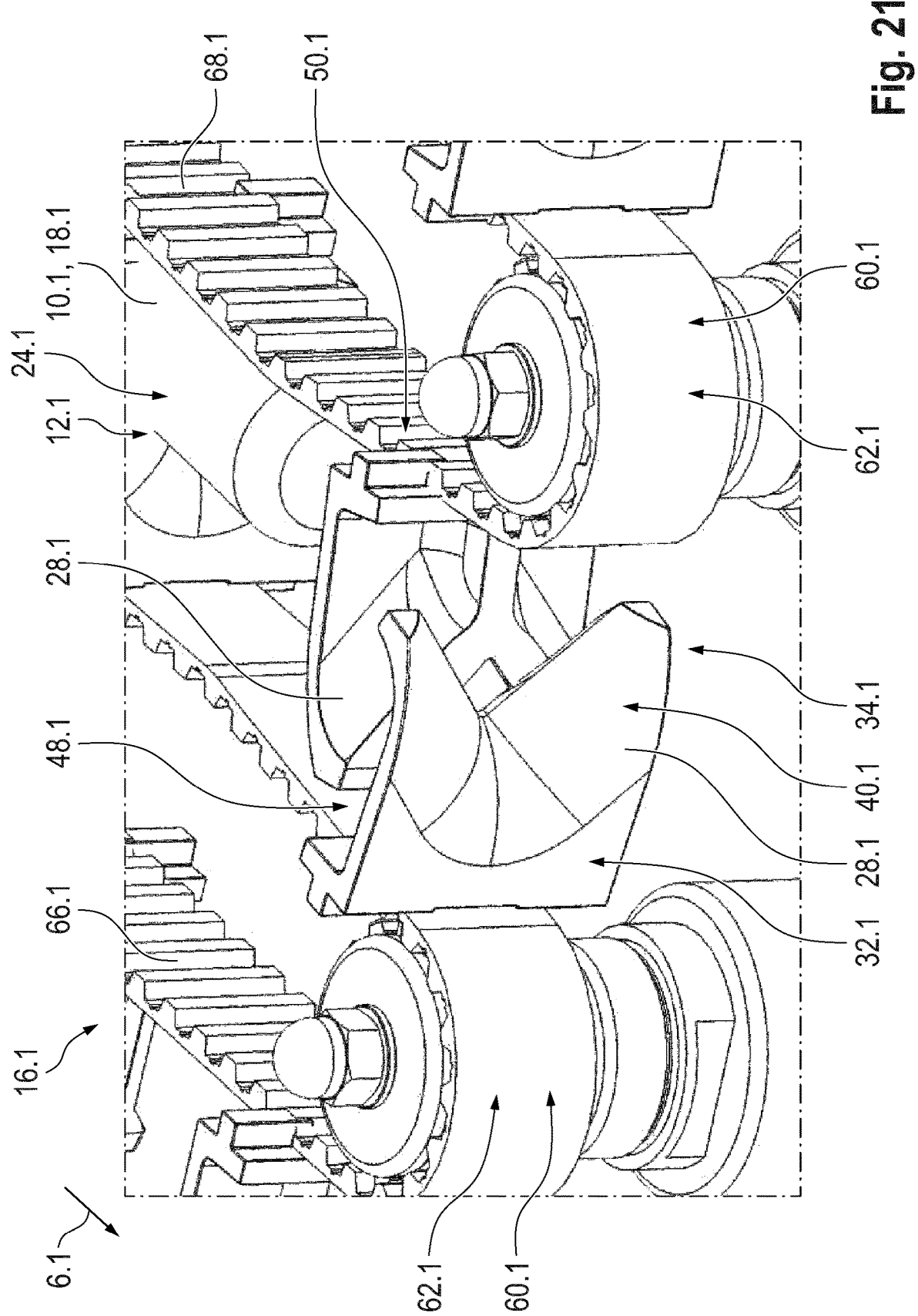
FIG. 21 shows a perspective view of the separator of FIG. 20, in one of several different operating states.

FIG. 21 shows a detailed view of separator 16.1. As has already been described with reference to FIG. 20, conveyor belts 66.1, 68.1 are each driven by a toothed belt drive 62. The toothed belt drives 62.1 that can be seen in FIG. 21 are arranged in the region of deflection region 60.1. Conveyor belts 66.1, 68.1 have receiving elements 50.1 in which crimping members 28.1, in particular attachment portion 32.1 of crimping members 28.1, are arranged.

In the state shown in FIG. 21, the crimping members 28.1 guided oppositely and adjacent each other have already been displaced relative to each other in such a way that only a reduced cross-section remains between the adjacent crimping members 28.1, in this case an open, diamond-shaped cross-section. In operation, the constriction region 30.1 of sausage portion 10.1 extends through the open cross-section, although this is not shown here.

Figure 22:
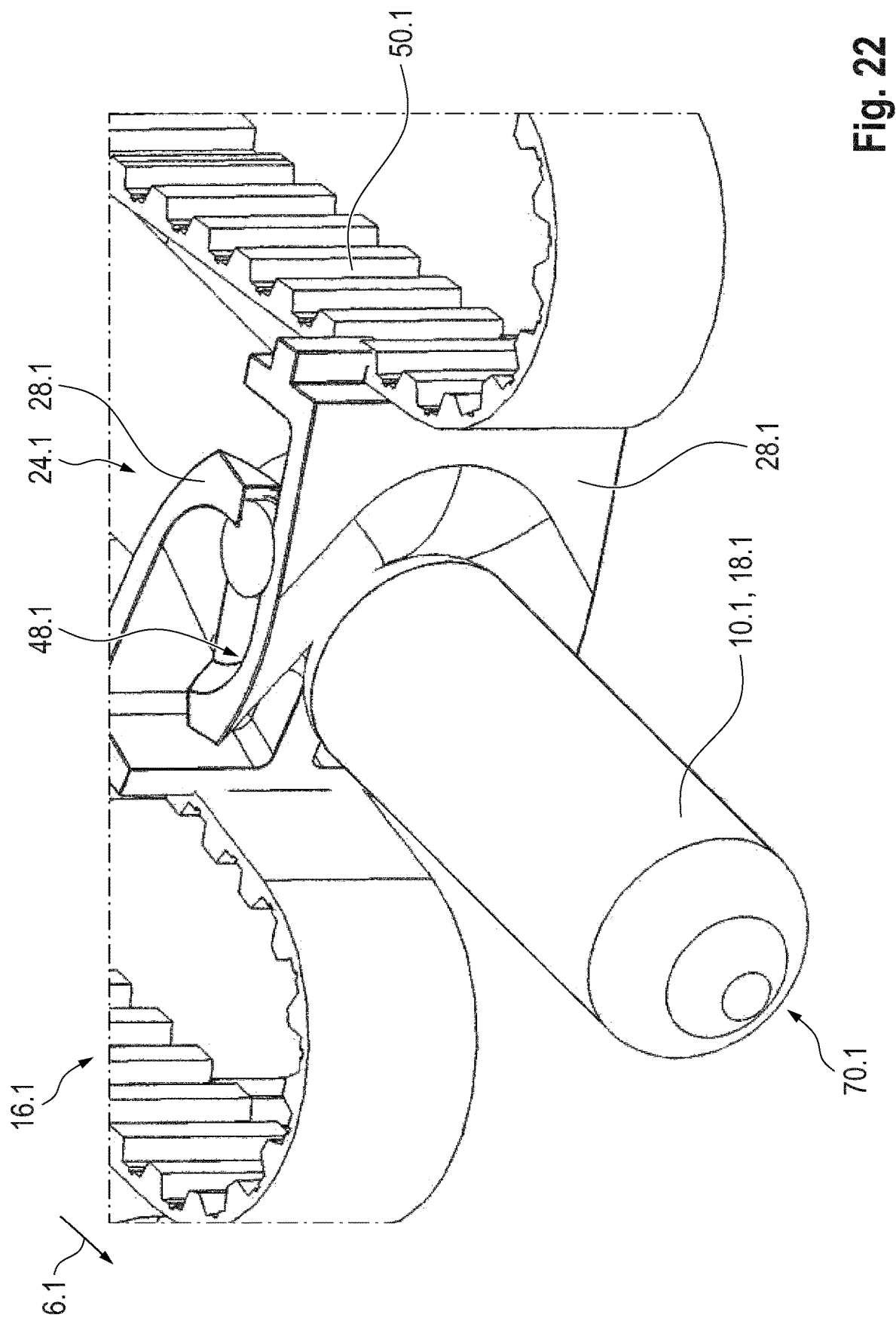
FIG. 22 shows a perspective view of the separator of FIG. 20, in another of several operating states.
Figure 23:
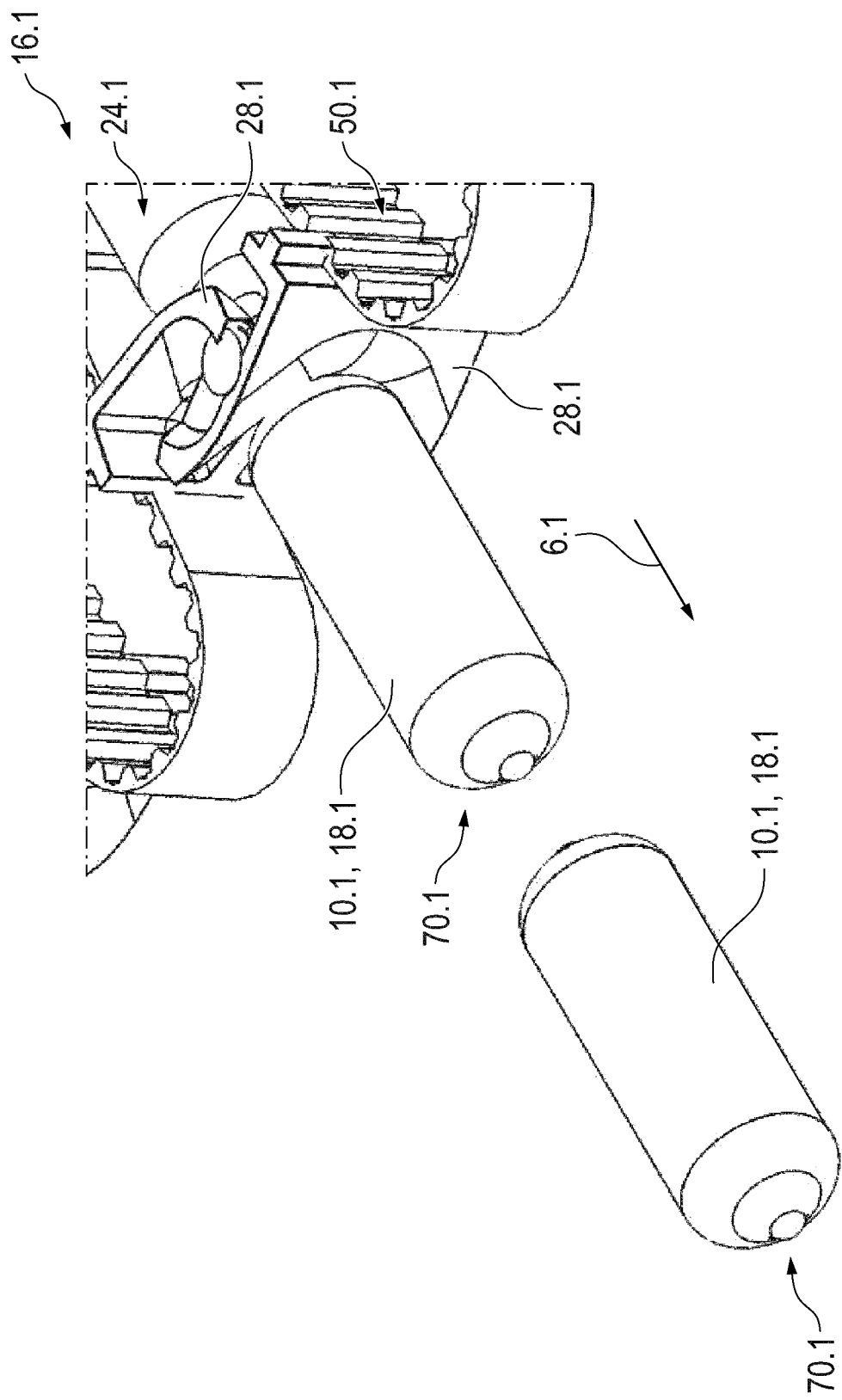
FIG. 23 shows a perspective view of the separator of FIG. 20, in yet another of several operating states.

Due to the further onward movement of crimping members 28.1 in conveying direction 6.1, crimping members 28.1 are moved further relative to each other in the direction of the respective diagonally opposite crimping member 28.1, with the result that the free cross-section is further reduced, and sausage portion 10.1 is finally separated. Such a state shortly before separation of sausage portion 10.1 is shown in FIG. 22. It can also be seen from FIG. 22 that sausage portion 10.1 is displaced, beyond the sausage shape to be produced, by the shape of the crimping member 28.1 which is arranged here in the foreground. This causes a rim-shaped sausage end 70.1 to first be formed. Two sausage portions 10.1 with such rim-shaped sausage ends 70.1 are illustrated in FIG. 23.

Figure 24A:
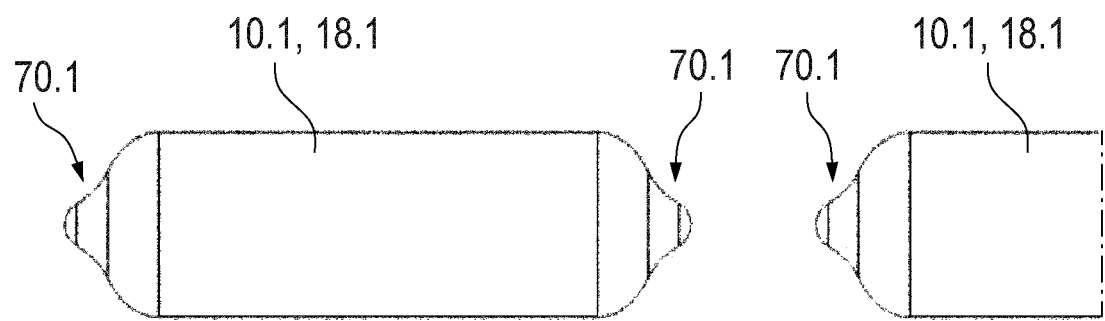
FIGS. 24a and 24b show side views of sausage portions formed by the separator of FIGS. 20 and 21
Figure 24B:
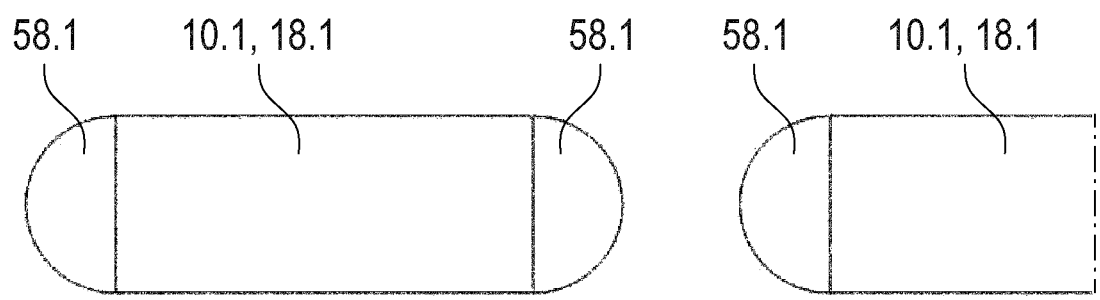

As is also shown in FIG. 24a, the respective rim-shaped sausage end 70.1 is formed immediately after sausage portion 10.1 is separated by the crimping member 28.1 according to the invention. However, sausage 10.1 does not keep the rim-shaped sausage ends 70.1 that are shown in FIG. 24a and also in FIGS. 22 and 23, but acquires a round sausage end 58.1 after some time, in particular after the mass inside casing 18.1 has relaxed or flowed back. In other words, due to the specific shape of crimping members 28.1, which have a curvature 40.1 according to the invention, the sausage mixture is first displaced beyond the shape to be produced, namely the round shape, which ultimately results in the round sausage ends 58.1 being formed after was equalization processes within the mass.

Figure 25:
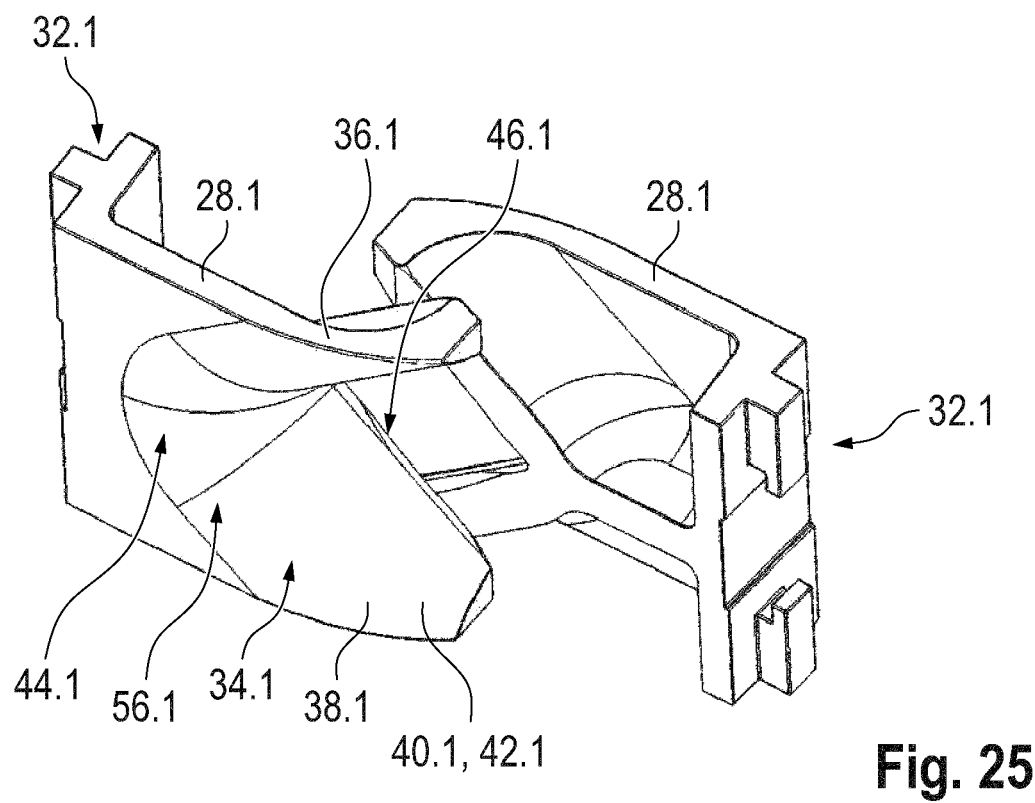
FIG. 25 shows a perspective view of crimping members according to one embodiment of the invention.
Figure 26:
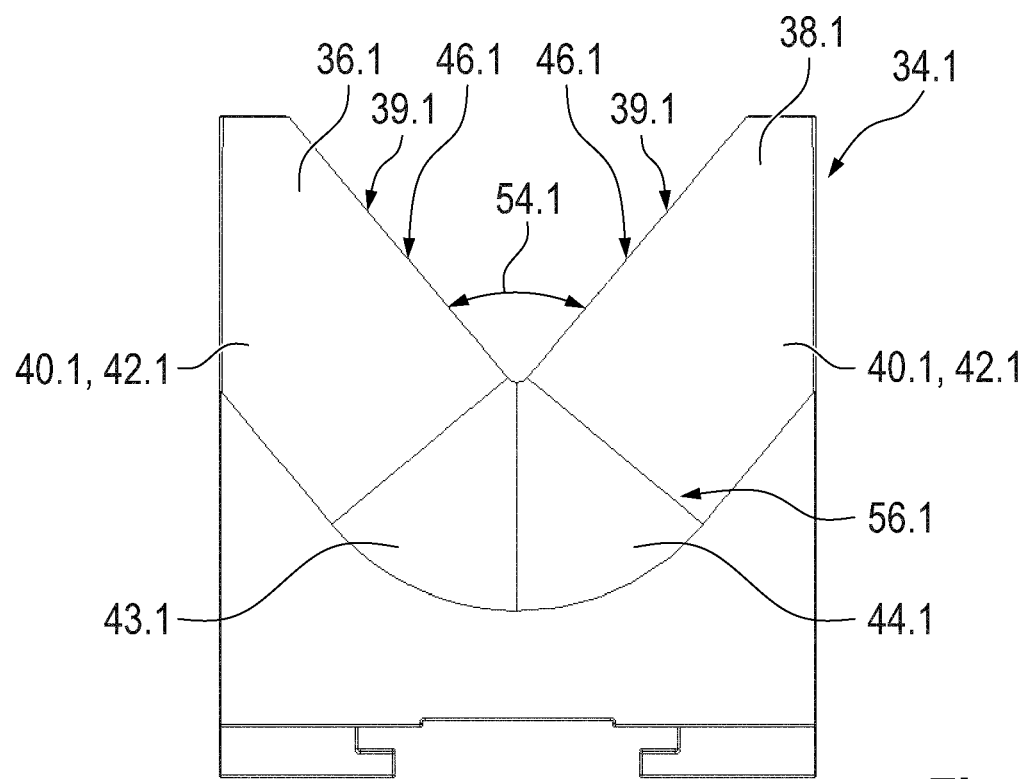
FIG. 26 shows an end view of crimping members according to another embodiment of the invention.
Figure 27:
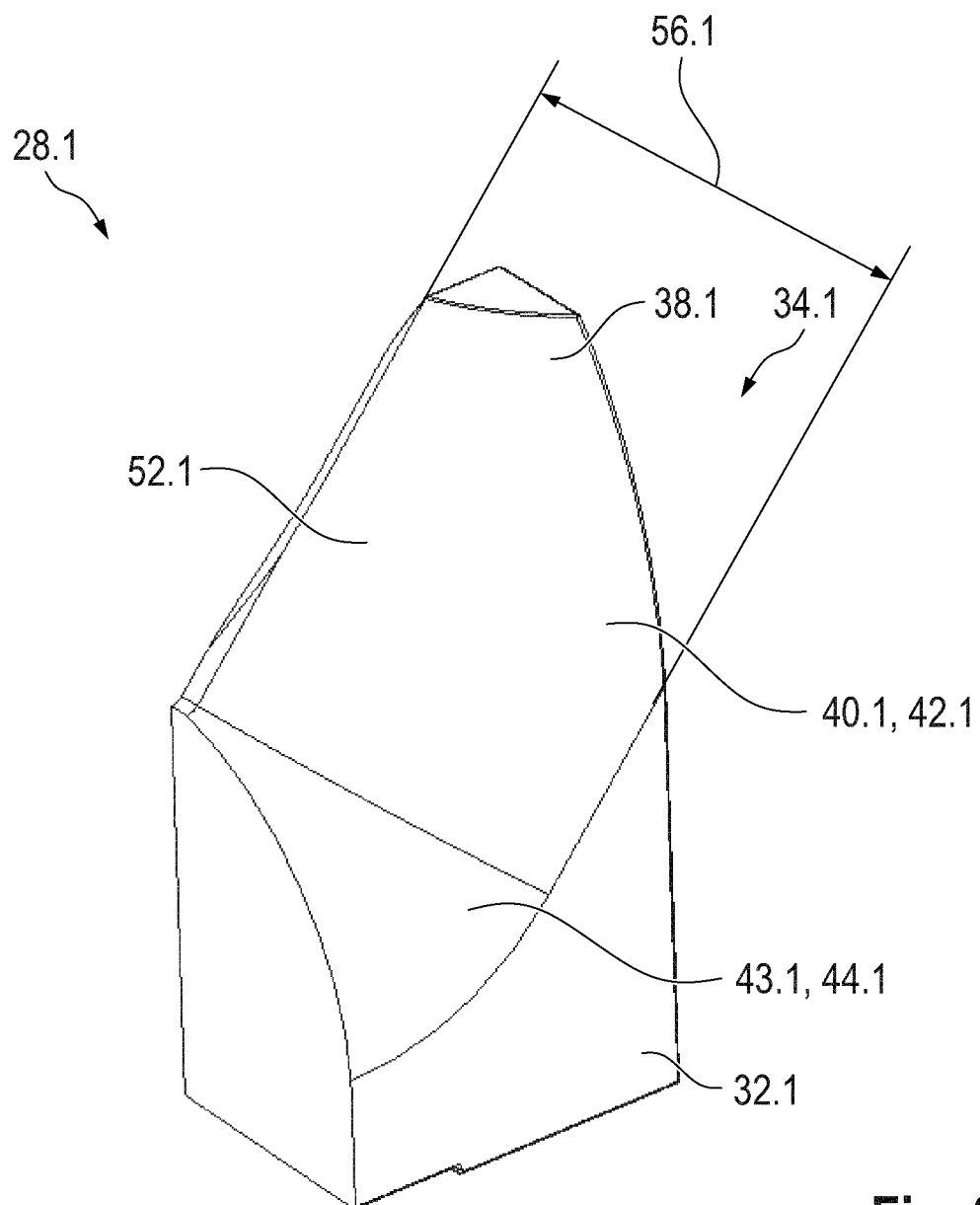
FIG. 27 shows a perspective view of crimping members according to yet another embodiment of the invention.

Crimping members 28.1 according to the invention shall now be described in more detail with reference to FIGS. 25 to 27. Crimping member 28.1 has an attachment portion 32.1 for attaching crimping member 28.1 to conveyor member 22a, 22b. A crimping portion 34.1 is arranged adjacent attachment portion 32.1. Crimping portion 34.1 has two legs 36.1, 38.1 that open to form a base portion 43.1. Legs 36.1, 38.1 are provided with a curvature 40.1 on their side which in operation faces away from the adjacently arranged second crimping member 28.1. Due to curvature 40.1, stuffed casing 18.1 is first constricted in a constriction region 30.1 with displacement of the mass, and then severed. In this case, curvature 40.1 takes the form of a convex curvature 42.1. Base portion 43.1 likewise has a curvature which is in the form of a convex curvature, in particular.

A cutting edge 46.1 is formed on the inner sides of legs 39.1. Curved region 40.1 has a thickness 52.1 in conveying direction 6.1. Legs 36.1, 38.1 also have an opening angle 54.1. Transition 56.1 between the curvature of base portion 43.1 and the curvature 40.1 of legs 36.1, 38.1 is free of creases.

Further preferred features of the separator 16.1 are described in further detail below with reference to the following embodiments. These will be understood to be combinations of features that can be claimed in addition to any subject matter in the claims appended below.

Embodiment 1. An embodiment (16.1) for separating portions (10.1) from elongate casings (18.1) stuffed with food mass, in particular for separating sausages (10.1) from alginate casings stuffed with sausage meat (18.1), comprising two circulating conveyor members (22*a*, 22*b*) spaced apart from one another and drivable by at least one drive element (20.1), each having a conveying area (24.1) which in operation is moved in a conveying direction (6), and a return area (26), wherein the stuffed casing (18.1) can be introduced between the conveying areas (24.1) of the two conveyor members (22*a*, 22*b*) and conveyed in the conveying direction (6.1), and wherein the conveyor members (22*a*, 22*b*) are oriented in such a way that the distance between the conveyor members (22*a*, 22*b*) in the conveying area (24.1) decreases in the conveying direction (6.1), at least one crimping member (28.1) arranged on each conveyor member (22*a*, 22*b*) and projecting laterally from the conveyor member (22*a*, 22*b*), wherein two crimping members of the spaced-apart conveyor members (22*a*, 22*b*) are shaped in such a way and arranged adjacent one another in the conveying area (24.1), and are moved toward each other when moved in the conveying direction (6.1), wherein the crimping member (28.1) has an attachment portion (32.1) for attaching the crimping member (28.1) to the conveyor member (22*a*, 22*b*) and a crimping portion (34.1) arranged adjacent the attachment portion (32.1), wherein the crimping portion (34.1) has two legs (36.1, 38.1) that open from a base portion (43.1), and characterized in that the legs (36.1, 38.1) are curved on their side facing an adjacently arranged second crimping member (28.1) in operation, such that the stuffed casing (18.1) is first constricted in a constriction region (30.1) with displacement of the mass, and then severed.

Embodiment 2. The embodiment (16.1) according to embodiment 1, characterized in that the curvature (40.1) is in the form of a convex curvature (42.1), in particular.

Embodiment 3. The embodiment (16.1) according to any one of the preceding embodiments, characterized in that the base portion (43.1) has a curvature which is in the form of a convex curvature, in particular.

Embodiment 4. The embodiment (16.1) according to any one of the preceding embodiments, characterized in that a cutting edge (46.1) is formed on the inner sides (39.1) of the legs (36.1, 38.1).

Embodiment 5. The embodiment (16.1) according to any one of the preceding embodiments, characterized in that the crimping member (28.1) is made of or consists of one of the following materials: metal, and polyoxymethylene.

Embodiment 6. The embodiment (16.1) according to any one of the preceding embodiments, characterized in that the crimping members (28.1) are oriented relative to the conveyor members (22*a*, 22*b*) in such a way that the crimping members (28.1) are guided in the conveying area (24.1) adjacent and parallel to each other.

Embodiment 7. The embodiment (16.1) according to any one of the preceding embodiments, characterized in that the conveyor members (22*a*, 22*b*) have receiving elements (50.1) for receiving the attachment portions (32.1) of the crimping members (28.1).

Embodiment 8. The embodiment (16.1) according to any one of the preceding embodiments, characterized in that the curved region (40.1) has a thickness (52.1) in the conveying direction (6.1) of 5 mm to 20 mm.

Embodiment 9. The embodiment (16.1) according to any one of the preceding embodiments, characterized in that the opening angle (54.1) between the legs (36.1, 38.1) is 15° to 120°.

Embodiment 10. The embodiment (16.1) according to any one of the preceding embodiments, characterized in that the transition (56.1) between the curvature of the base portion (43.1) and the curvature (40.1) of the legs (36.1, 38.1) is free of creases.

Embodiment 11. A crimping member (28.1) for an embodiment (16.1) for separating portions (10) from elongate casings (18.1) stuffed with food mass, in particular for separating sausages (10.1) from alginate casings (18.1) stuffed with sausage meat, said crimping member (28) having an attachment portion (32.1) for attaching it to a movable conveyor member (22*a*, 22*b*) and a crimping portion (34.1) arranged adjacent the attachment portion (32.1), wherein the crimping portion (34.1) has two legs (36.1, 38.1) that open from a base portion (43.1), characterized in that the legs (36.1, 38.1) are curved on their side facing an adjacently arranged second crimping member (28.1) in operation, such that the stuffed casing (18.1) is first constricted in a constriction region (30.1) with displacement of the mass and then severed.

Embodiment 12. The crimping member (28.1) according to embodiment 11, characterized in that the crimping member (28.1) is designed in accordance with at least one of the characterizing features of preceding embodiments 2 to 10.

Embodiment 13. A method for forming and separating portions (10.1) from elongate casings (18.1) stuffed with food mass, in particular for forming and separating sausages (10.1) from alginate casings (18.1) stuffed with sausage meat, in which method food mass is stuffed by a stuffing machine (4) into the casing (18.1) to be stuffed, the stuffed casing (18.1) is conveyed in a conveying direction (6.1) by a separator (16.1), wherein the stuffed casing (18.1) is brought between two drivable, circulating conveyor members (22*a*, 22*b*) and is constricted and separated in a constriction region (30.1) by two adjacently arranged crimping members (28.1) each arranged on a conveyor member (22*a*, 22*b*), characterized in that the crimping members (28.1) are curved (40.1) in such a way that the mass is displaced beyond the sausage shape to be produced, so that a round shape is formed at the ends (58.1) of the sausage portions (10.1) after the mass has relaxed or flowed back.

The embodiments described above are only descriptions of preferred embodiments of the present invention, and are not intended to limit the scope of the present invention. Various variations and modifications can be made to the technical solution of the present invention by those of ordinary skills in the art, without departing from the design and spirit of the present invention. The variations and modifications should all fall within the claimed scope defined by the claims of the present invention.

What is claimed is:

1. A portioning device for forming casing portions from elongate casings stuffed with food mass, comprising:
   two circulating conveyor members spaced apart from one another and drivable by at least one drive element, each having a conveying area which in operation is moved in a conveying direction, and a return area,
   wherein the stuffed casing can be introduced between the conveying areas of the two conveyor members and conveyed in the conveying direction, and
   at least one crimping member arranged on each conveyor member and projecting laterally from the conveyor member,
   wherein two crimping members, one being arranged on each of the spaced-apart conveyor members, are shaped and arranged opposite each other in the conveying area and co-operate in such a way that the stuffed casing is constricted with displacement of the food mass in a constriction region, wherein at least one of the crimping members includes a functional area that is configured to at least partially face a similar functional area located on an opposite crimping member when in the conveying area, the functional areas being configured to press together to form corrugations, creases and/or folds extending substantially parallel to the conveying direction in the constriction region of the casing, wherein the at least one of the crimping members includes indentations and projections at least partially on the functional area, and wherein the indentations and projections are arranged at least partially within a substantially planar portion of a surface defining the functional area, so that when the functional areas of the crimping members are pressed together by movement of the conveyor members, the crimping members create a substantially flat two-dimensional zone between two casing portions defining the constriction region, with the constriction region also including the corrugations, creases and/or folds along the substantially flat two-dimensional zone.

2. The portioning device of claim 1, wherein the indentations and projections are arranged substantially in a central region of the functional area, wherein a length of the indentations and projections on a crimping member differ, and wherein the length is measured in the conveying direction and the length of the indentations and projections increase outwards from the central region.

3. The portioning device of claim 1, wherein the indentations and projections extend substantially parallel to the conveying direction.

4. The portioning device of claim 1, wherein, in operation, respective crimping members arranged opposite one another are conformingly adapted on their functional area facing their opposite crimping member in such a way that an indentation on the one crimping member is arranged opposite a projection on the other, opposite crimping member, and/or a projection on the one crimping member extends at least partly into an indentation on the other, opposite crimping member, and the casing therebetween is corrugated, folded, and/or creased accordingly to form corrugations, creases and/or folds.

5. The portioning device of claim 2, wherein a first leg surface and a second leg surface are formed, the first leg surface being arranged on a crimping member adjacent the central region of a crimping member, at the front in the conveying direction and at least partly substantially at an angle of approximately 0-60° to the central region, the second leg surface being arranged at the rear in the conveying direction and at least partly substantially at an angle to the central region.

6. The portioning device of claim 5, wherein the first leg surface and/or the second leg surface has at least partly a concave shape.

7. The portioning device of claim 6, wherein the first and/or second leg surface has a concave shape that is substantially spherical, elliptical or parabolic or similarly curved, such that a substantially hemispherical, elliptical or parabolic end of a casing portion adjacent the constriction region is formed by the co-operation of oppositely arranged crimping members.

8. The portioning device of claim 2, wherein at least one crimping member has guide members spaced apart from one another in outer regions in relation to the central regions, said guide members being spaced apart at such a distance from each other that the crimping member oppositely arranged in the conveying area, in operation, can be gripped at least partially on both sides by the guide members.

9. The portioning device of claim 1, wherein a width of the indentations and projections, measured substantially transversely to the conveying direction, is approximately 0.2-0.8 of a total width of the crimping member.

10. The portioning device of claim 1, wherein the indentations and projections correspond substantially, in a side view, to one of the following shapes: a waveform, a triangular waveform, a square waveform, an undulating waveform, a sinusoidal waveform.

11. The portioning device of claim 1, wherein a crimping member has attachment elements, on a side facing the conveyor member, for coupling the crimping member releasably and form-lockingly to the conveyor member.

12. The portioning device of claim 2, wherein the portioning device is configured to separate alginate casings stuffed with sausage meat into separate lengths of sausages, the sausages defining the casing portions, wherein the indentations and projections extend substantially parallel to the conveying direction, wherein, in operation, respective crimping members arranged opposite one another are conformingly adapted on their functional area facing their opposite crimping member in such a way that an indentation on the one crimping member is arranged opposite a projection on the other, opposite crimping member, and/or a projection on the one crimping member extends at least partly into an indentation on the other, opposite crimping member, and the casing therebetween is corrugated, folded, and/or creased accordingly to form corrugations, creases and/or folds, wherein a first leg surface and a second leg surface are formed, the first leg surface being arranged on a crimping member adjacent the central region of a crimping member, at the front in the conveying direction and at least partly substantially at an angle of approximately 0-60° to the central region, the second leg surface being arranged at the rear in the conveying direction and at least partly substantially at an angle to the central region, wherein the first leg surface and/or the second leg surface has at least partly a concave shape, wherein the first and/or second leg surface has a concave shape that is substantially spherical, elliptical or parabolic or similarly curved, such that a substantially hemispherical, elliptical or parabolic end of a casing portion adjacent the constriction region is formed by the co-operation of oppositely arranged crimping members, wherein at least one crimping member has plate-shaped guide members spaced apart from one another in outer regions in relation to the central regions, which have indentations and/or projections, said guide members being spaced apart at such a distance from each other that the crimping member oppositely arranged in the conveying area, in operation, can be gripped at least partially on both sides by the guide members, wherein a width of the indentations and projections, measured substantially transversely to the conveying direction, is approximately 0.2-0.8 of a total width of the crimping member, wherein the indentations and projections correspond substantially, in a side view, to one of the following shapes: a waveform, a triangular waveform, a square waveform, an undulating waveform, a sinusoidal waveform, and wherein a crimping member has attachment elements, on a side facing the conveyor member, for coupling the crimping member releasably and form-lockingly to the conveyor member, specifically fasteners and/or latching elements and/or projections and/or indentations.

13. The portioning device of claim 1, wherein the portioning device is included in an assembly for forming portions from elongate casings stuffed with food mass, the assembly further comprising a stuffing machine and a separator.

14. A crimping member, for a portioning device for forming casing portions from casings stuffed with food mass, comprising:
- attachment elements on an inner side for attachment to a movable conveyor member,
- a functional area that includes indentations and projections at least partially on the functional area, the functional area being configured to at least partially face a similar functional area located on an opposite crimping member when in a conveying area of the portioning device, the functional areas being configured to press together to form corrugations, creases and/or folds extending substantially parallel to a conveying direction in a constriction region of the casing,
- wherein the indentations and projections are arranged at least partially within a substantially planar portion of a surface defining the functional area, so that when the crimping member is pressed together with the opposite crimping member by movement of the conveyor member, the crimping members create a substantially flat two-dimensional zone between two casing portions defining the constriction region, with the constriction region also including the corrugations, creases and/or folds along the substantially flat two-dimensional zone, and
- wherein the indentations and projections are arranged substantially in a central region of the functional area,
- wherein a length of the indentations and projections on the crimping member differ, and wherein the length is measured in the conveying direction and the length of the indentations and projections increase outwards from the central region.

15. The crimping member according to claim 14, wherein the crimping member is a pre-crimping member, the crimping member is configured to separate sausages from casings stuffed with sausage meat, and wherein the crimping member includes at least one of the following:
- in operation, respective crimping members arranged opposite one another are conformingly adapted on their functional area facing their opposite crimping member in such a way that an indentation on the one crimping member is arranged opposite a projection on the other, opposite crimping member, and/or a projection on the one crimping member extends at least partly into an indentation on the other, opposite crimping member, and the casing therebetween is corrugated, folded, and/or creased accordingly to form corrugations, creases and/or folds,
- a first leg surface and a second leg surface are formed, the first leg surface being arranged on the crimping member adjacent the central region of the crimping member, at the front in the conveying direction and at least partly substantially at an angle of approximately 0-60° to the central region, the second leg surface being arranged at the rear in the conveying direction and at least partly substantially at an angle to the central region, the first leg surface and/or the second leg surface has at least partly a concave shape,
- the first and/or second leg surface has a concave shape that is substantially spherical, elliptical or parabolic or similarly curved, such that a substantially hemispherical, elliptical or parabolic end of a casing portion adjacent the constriction region is formed by the co-operation of oppositely arranged crimping members,
- the crimping member has plate-shaped guide members spaced apart from one another in outer regions in relation to the central regions, which have indentations and/or projections, said guide members being spaced apart at such a distance from each other that the crimping member oppositely arranged in the conveying area, in operation, can be gripped at least partially on both sides by the guide members,
- a width of the indentations and projections, measured substantially transversely to the conveying direction, is approximately 0.2-0.8 of a total width of the crimping member,
- the indentations and projections correspond substantially, in a side view, to one of the following shapes: a waveform, a triangular waveform, a square waveform, an undulating waveform, a sinusoidal waveform, and
- the crimping member has attachment elements, on a side facing the conveyor member, for coupling the crimping member releasably and form-lockingly to the conveyor member, specifically fasteners and/or latching elements and/or projections and/or indentations.

16. A method for forming casing portions from elongate casings stuffed with food mass, comprising:
- a food mass is stuffed by a stuffing machine into a casing to be stuffed,
- the stuffed casing is conveyed in a conveying direction by a portioning device,
- wherein the stuffed casing is brought between two drivable, circulating conveyor members and is constricted in a constriction region by two oppositely arranged crimping members each arranged on a conveyor member,
- wherein at least one of the crimping members includes a functional area that is configured to at least partially face a similar functional area located on an opposite crimping member when in the conveying area, the functional areas being pressed together to form corrugations, creases and/or folds,
- wherein the corrugations, creases and/or folds that are formed extend substantially parallel to the conveying direction due to the shape and arrangement of the opposite crimping members in the constriction region of the casing, and
- wherein at least one of the crimping members includes indentations and projections at least partially on the functional area, and wherein the indentations and projections are arranged at least partially within a substantially planar portion of a surface defining the functional area, so that when the functional areas of the crimping members are pressed together by movement of the conveyor members, the crimping members create a substantially flat two-dimensional zone between two casing portions defining the constriction region, with the constriction region also including the corrugations, creases and/or folds along the substantially flat two-dimensional zone.

17. The method of claim 16, further comprising:
providing the portioning device so as to include:

two of the circulating conveyor members spaced apart from one another and drivable by at least one drive element, each having a conveying area which in operation is moved in a conveying direction, and a return area, wherein the stuffed casing can be introduced between the conveying areas of the two conveyor members and conveyed in the conveying direction, and at least one crimping member arranged on each conveyor member and projecting laterally from the conveyor member.

18. The method of claim 16, wherein the indentations and projections are arranged substantially in a central region of the functional area, wherein a length of the indentations and projections on a crimping member differ, and wherein the length is measured in the conveying direction and the length of the indentations and projections increase outwards from the central region.

* * * * *